United States Patent
Sepas-Moghaddam et al.

(10) Patent No.: US 12,230,058 B2
(45) Date of Patent: Feb. 18, 2025

(54) SYSTEMS, METHODS, AND STORAGE MEDIA FOR CREATING IMAGE DATA EMBEDDINGS TO BE USED FOR IMAGE RECOGNITION

(71) Applicant: IRDETO B.V., Hoofddorp (NL)

(72) Inventors: Alireza Sepas-Moghaddam, Kingston (CA); Ali Etemad, Kanata (CA); Mojtaba Kolahdouzi, Kingston (CA)

(73) Assignee: IRDETO B.V., LS Hoofddorp (NL)

( * ) Notice: Subject to any disclaimer, the term of this patent is extended or adjusted under 35 U.S.C. 154(b) by 345 days.

(21) Appl. No.: 17/690,175

(22) Filed: Mar. 9, 2022

(65) Prior Publication Data

US 2022/0292877 A1    Sep. 15, 2022

(51) Int. Cl.
*G06V 40/16* (2022.01)
*G06V 10/82* (2022.01)

(52) U.S. Cl.
CPC .......... *G06V 40/172* (2022.01); *G06V 10/82* (2022.01)

(58) Field of Classification Search
CPC .... G06V 40/172; G06V 10/82; G06V 40/171; G06V 40/175; G06V 40/1685; G06V 40/165; G06N 3/08
See application file for complete search history.

(56) References Cited

U.S. PATENT DOCUMENTS

| | | | |
|---|---|---|---|
| 11,763,468 B2 * | 9/2023 | Miao | G06T 7/68 382/103 |
| 2019/0095698 A1 * | 3/2019 | Cole | G06N 20/00 |
| 2019/0385014 A1 * | 12/2019 | Malak | G06F 40/146 |

OTHER PUBLICATIONS

Liu et al., Video-based Facial Expression Recognition using Graph Convolutional Networks, Jan. 10-15, 2021, 2020 25th International Conference on Pattern Recognition (ICPR), Milan, Italy, Abstract (Year: 2021).*
Ngoc Quang Tran et al: "Facial Landmark-Based Emotion Recognition via Directed Graph Neural Network", Electronics, vol. 9, No. 5, May 6, 2020 (May 6, 2020), p. 764.
Taheri Aynaz et al: "Sequence-to-sequence modeling for graph representation learning", Applied Network Science, vol. 4, No. 64, Aug. 24, 2019 (Aug. 24, 2019), pp. 1-26.

(Continued)

*Primary Examiner* — Brandon J Miller
(74) *Attorney, Agent, or Firm* — James J. DeCarlo; Greenberg Traurig, LLP (57) ABSTRACT

Disclosed implementations include a method, apparatus and computer media for learning an optimal graph in the form of a tree topology defining a sequence that can be used by a learning network for image recognition. Image data representing the image of an object is received and N landmarks are detected on the image using a deep regression algorithm, wherein N is an integer. A weighted, fully connected, graph is constructed from the landmarks by assigning initial weights for the landmarks randomly. An optimized tree structure is determined based on the initial weights. A sequence is generated by traversing nodes of the tree structure and a series of embeddings representing the object image are generated based on the sequence. The embeddings can be processed by a neural network to generate an image recognition signal based on the embeddings.

25 Claims, 9 Drawing Sheets

(56) References Cited

OTHER PUBLICATIONS

Yin Yu et al: "Dual-Attention GAN for Large-Pose Face Frontalization", 2020 15th IEEE International Conference on Automatic Face and Gesture Recognition (FG 2020), IEEE, Nov. 16, 2020 (Nov. 16, 2020), pp. 249-256.
Zhang Si et al: "Graph Convolutional Networks: Algorithms, Applications and Open Challenges", Nov. 18, 2018 (Nov. 18, 2018), Advances in Databases and Information Systems; [Lecture Notes in Computer Science; Lect.Notes Computer], Springer International Publishing, Cham, pp. 79-91.
EP21162658.5 Extended European Search Report dated Aug. 25, 2021.

* cited by examiner

SYSTEMS, METHODS, AND STORAGE MEDIA FOR CREATING IMAGE DATA EMBEDDINGS TO BE USED FOR IMAGE RECOGNITION

FIELD OF THE DISCLOSURE

The present disclosure relates to systems, methods, and storage media for enhancing image data for image recognition processes.

BACKGROUND

Facial expressions have been regarded as one of the most common non-verbal cues for conveying different human emotional states and feelings. The area of automatic facial expression recognition (FER) from images or videos has received considerable attention from computer vision and machine learning communities. With the recent developments in deep neural networks, the availability of high computational power, and abundance of data, rapid advances in automated FER systems have been witnessed.

Yichuan Tang, *Deep learning using support vector machines*, CoRR, abs/1306.0239, 2, 2013, teaches neural network-based methods for FER in which a shallow Convolutional Neural Network (CNN) is used for feature learning, followed by a linear support vector machine (SVM) for classification. Anbang Yao, Dongqi Cai, Ping Hu, Shandong Wang, Liang Sha, and Yurong Chen, *Holonet: towards robust emotion recognition in the wild*, Proceedings of the 18th ACM International Conference on Multimodal Interaction, pages 472-478, 2016, discloses a system known as HoloNet, which combines residual structures with a concatenated rectified linear activation scheme. In addition, an inception-residual structure was adopted in the final layers to enable multi-scale feature extraction.

Xiaofeng Liu, B V K Vijaya Kumar, Ping Jia, and Jane You, *Hard negative generation for identity-disentangled facial expression recognition*, Pattern Recognition, 88:1-12, 2019, teaches the notion of disentanglement to make FER systems more robust against pose, illumination, and other variations. In this context, a radial metric learning strategy was used for disentangling identity-specific factors from facial input images. Yuedong Chen, Jianfeng Wang, Shikai Chen, Zhongchao Shi, and Jianfei Cai, *Facial motion prior networks for facial expression recognition*, IEEE Visual Communications and Image Processing, 2019, teaches an attention method to selectively focus on facial muscle moving regions. To guide the attention learning process, prior domain knowledge was incorporated by considering the differences between neutral and expressive faces during training.

The softmax loss function (also known as "softargmax" or "normalized exponential function") reduces the negative effects caused by data imbalance, particularly when the classifier is biased toward the majority class. Dimitrios Kollias, Shiyang Cheng, Evangelos Ververas, Irene Kotsia, and Stefanos Zafeiriou, *Deep neural network augmentation: Generating faces for affect analysis*' International Journal of Computer Vision, pages 1-30, 2020, teaches synthesizing facial affects from a neutral image. This reference teaches a model accepts a neutral image and a basic facial expression as inputs, and fits a 3D Morphable model on the neutral image, then deforms it for adding the expression. In Behzad Hasani, Pooran Singh Negi, and Mohammad H Mahoor, *Bounded residual gradient networks (breg-net) for facial affect computing*, 2019 14th IEEE International Conference on Automatic Face & Gesture Recognition (FG 2019), pages 1-7, IEEE, 2019, a novel residual-based CNN architecture, Bounded Residual Gradient Network (BReG-Net), was proposed for FER. This CNN architecture includes 39 layers of residual blocks, where the standard skip connections in the ResNet blocks was replaced by a differentiable function with a bounded gradient, thus avoiding the gradient vanishing and exploding problems.

Neural networks on graph topologies have recently gained momentum for visual analysis tasks including FER. In Lei Zhong, Changmin Bai, Jianfeng Li, Tong Chen, Shigang Li, and Yiguang Liu, *A graph-structured representation with brnn for static-based facial expression recognition*, IEEE International Conference on Automatic Face & Gesture Recognition, pages 1-5, 2019, a method is disclosed in which features were first extracted from texture information around 49 facial landmarks and were then combined with the Euclidean distances calculated between landmark pairs to feed a bidirectional gated recurrent unit. Yuan Xie, Tianshui Chen, Tao Pu, Hefeng Wu, and Liang Lin, *Adversarial graph representation adaptation for cross domain facial expression recognition*, ACM international conference on Multimedia, pages 1255-1264, 2020 teaches that local regions around five landmark, including center of left and right eyes, nose, and left and right mouth corners, can be extracted to be then learned using a GCN. Unlike all these techniques which employ fully connected graphs for FER, a few known solutions assume a subset of connections between the nodes followed by a variation of graph convolutional networks. Nonetheless, conventional graph-based FER solutions utilize a pre-determined graph topology (whether fully connected or otherwise) to then use for every scenario.

FER has been widely employed in application domains such as robotics, driver fatigue detection, medical treatment, and others. Early FER methods were mostly designed to learn holistic representations of the face. However, recent methods have shifted focus toward part-based approaches by representing the face as salient and separate regions or disentangled components. This development is due to the facts that (i) expressions are mainly reflected in certain key components/regions of the face, e.g., mouth and periocular areas; and (ii) expressions can be associated with the movement of facial muscles in particular regions, also known as action units (AUs). Existing part-based FER methods generally process the facial regions independently to extract local features that are finally combined to form some global representation. In order to also make use of the existing relationships between facial regions, instead of simply combining local learned representations, graph-based FER methods have recently gained popularity.

While each node of a face graph can correspond to a facial region, an edge represents the relationship between the regions, e.g., their distance or joint movement. The constructed graph can then be further processed, for example using graph neural networks (GCNs) or recurrent neural networks (RNNs), to extract discriminative representations for emotion recognition. Although many graph-based FER solutions have achieved good results, there is no unique consensus on the topology of the underlying graphs, e.g., how different facial regions should connected to each other in order to maximize the performance of the network.

Current graph-based FER methods either construct fully connected (complete) graphs or make pre-defined assumptions regarding the graph topology. In the former approach, the number of edges in a complete graph is $\binom{n}{2}$, making the training of the network overly complex and thus rendering computing systems inefficient in FER technology. Moreover, some of the connections will inevitably not prove useful when training the FER system. In the latter case, on the other hand, as the graph topology is predefined as opposed to being learned, it may not necessarily consist of the optimal connections among facial regions. The topologies of these graphs, whether pre-defined or learned, can have considerable implications on the performance of networks including sequential learners that employ this information for obtaining part-based facial representations.

SUMMARY

Disclosed implementations include an end-to-end deep FER architecture capable of determining an optimal graph of the face in the form of a tree topology whose traversal creates a sequence, which can then be fed to a learner. A weighted complete graph is optimized by a combinatorial approach and a minimum-cost spanning tree is determined. The disclosed implementations, referred to as "named face tree topology network (FTNet)" herein, can consist of three blocks. In the first block, the tree learning is performed by extraction of facial landmarks and an optimization step to obtain the optimal tree. The optimized tree can be used in a two-stream framework to learn separate structure and texture representations. In the structure stream, the optimized tree is traversed to form a sequence, whose resultant embedding is then fed to an LSTM. This can be followed by a soft attention mechanism to focus on the salient cells of the LSTM network. In the texture stream, ResNet-50 features are extracted from the local patches around extracted facial landmarks, prior to learning a separate LSTM similar to the structure stream. Attention is also applied to the LSTM network, and the final embedding is fused with that of the structure stream to yield the expression class prediction. The disclosed implementations optimize the order of relevant facial regions prior to recurrently learning their dependencies for FER. While the examples focus FER, the disclosed implementations can be applied in various object recognition applications, such as recognizing objects on a roadway, and are not limited to FER applications.

One aspect of the present disclosure relates to a method for learning an optimal graph in the form of a tree topology defining a sequence that can be used by a learning network for image recognition, the method comprising: receiving image data representing the image of an object; detecting N landmarks on the image using a deep regression algorithm, wherein N is an integer; constructing a weighted, fully connected, graph $k_n$ from the landmarks by assigning initial weights for the landmarks randomly, determining the optimized tree structure based on the initial weights; generating a sequence by traversing the tree structure; forming a series of embeddings based on the sequence, the embeddings representing the object image; and inputting the embeddings into a neural network to thereby generate an image recognition signal based on the embeddings.

Another aspect of the present disclosure relates to a system for learning an optimal graph in the form of a tree topology defining a sequence that can be used by a learning network for image recognition, the method comprising: at least one computer processor configured to execute computer-readable instructions; and at least one memory device having computer-readable instructions recorded thereon which, when executed by the at least one computer processor, cause the at least one computer processor to conduct the method of: receiving image data representing the image of an object; detecting N landmarks on the image using a deep regression algorithm, wherein N is an integer; constructing a weighted, fully connected, graph $k_n$ from the landmarks by assigning initial weights for the landmarks randomly, determining the optimized tree structure based on the initial weights; generating a sequence by traversing the tree structure; forming a series of embeddings based on the sequence, the embeddings representing the object image; and inputting the embeddings into a neural network to thereby generate an image recognition signal based on the embeddings.

Another aspect of the present disclosure relates to non-transient computer readable media having computer-readable instructions recorded thereon which, when executed by at least one computer processor, cause the at least one computer processor to conduct the method of: receiving image data representing the image of an object; detecting N landmarks on the image using a deep regression algorithm, wherein N is an integer; constructing a weighted, fully connected, graph $k_n$ from the landmarks by assigning initial weights for the landmarks randomly, determining the optimized tree structure based on the initial weights; generating a sequence by traversing the tree structure; forming a series of embeddings based on the sequence, the embeddings representing the object image; and inputting the embeddings into a neural network to thereby generate an image recognition signal based on the embeddings.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Disclosed implementations learn an optimal face tree topology to be used in subsequent components of an image recognition network. However, the potential for differences, such as different poses present in facial images, or different angles of view in images of other objects, can cause erroneous variations in the tree topology, even when the same information is contained in the image. To remedy this, a Deep Attention Generative Adversarial Network (DA-GAN) can be used for face frontalization or other normalization techniques, thus making the disclosed implementations more robust against variations, such as pose variations. Image landmarks, such as facial landmarks in the example of a facial image, are determined from the frontalized images using a deep regression architecture and an integer number of landmarks from each input image.

Figure 1:
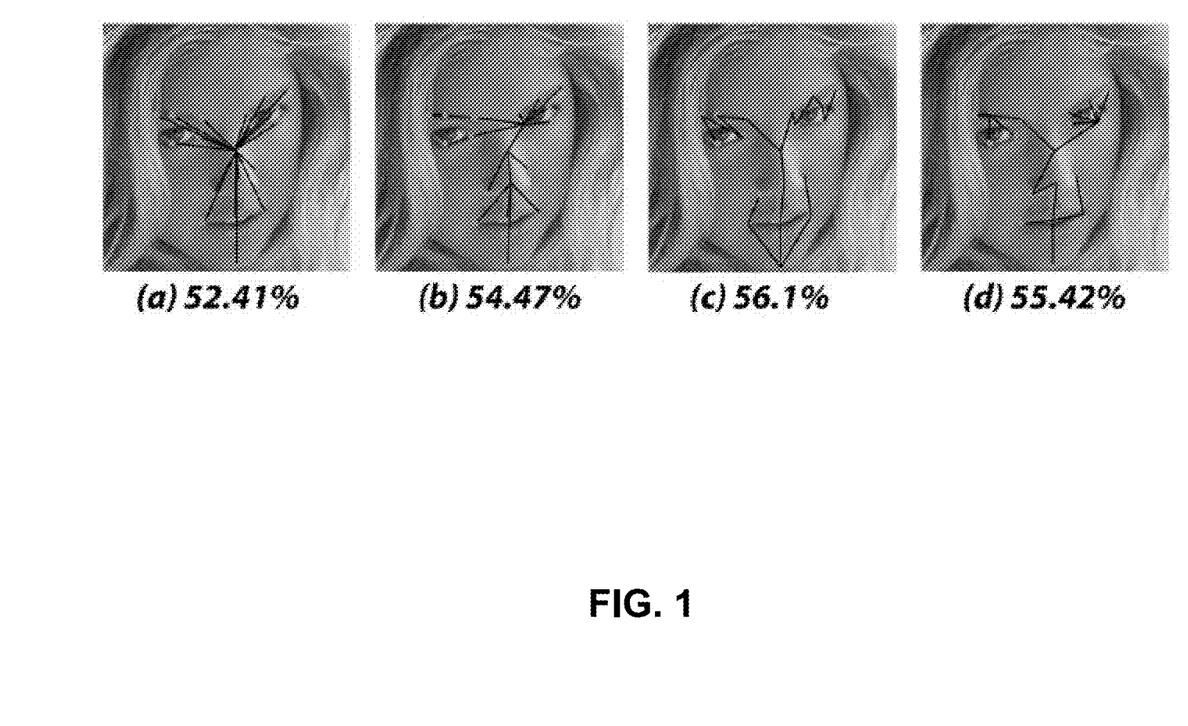
FIG. 1 shows a face image along with 4 random trees that were built on the extracted facial landmarks.

FIG. 1 shows a face image along with 4 random trees that were built on the extracted facial landmarks. Traversing these trees results in 4 different sequence-based embeddings that can be fed, for example, to 4 independent LSTM networks for a 7-class FER classification task. The resulting recognition rates are shown below each image in FIG. 1. An obtained performance range of 3.7% confirms the importance of finding the optimal tree for further image recognition processing.

Figure 2:
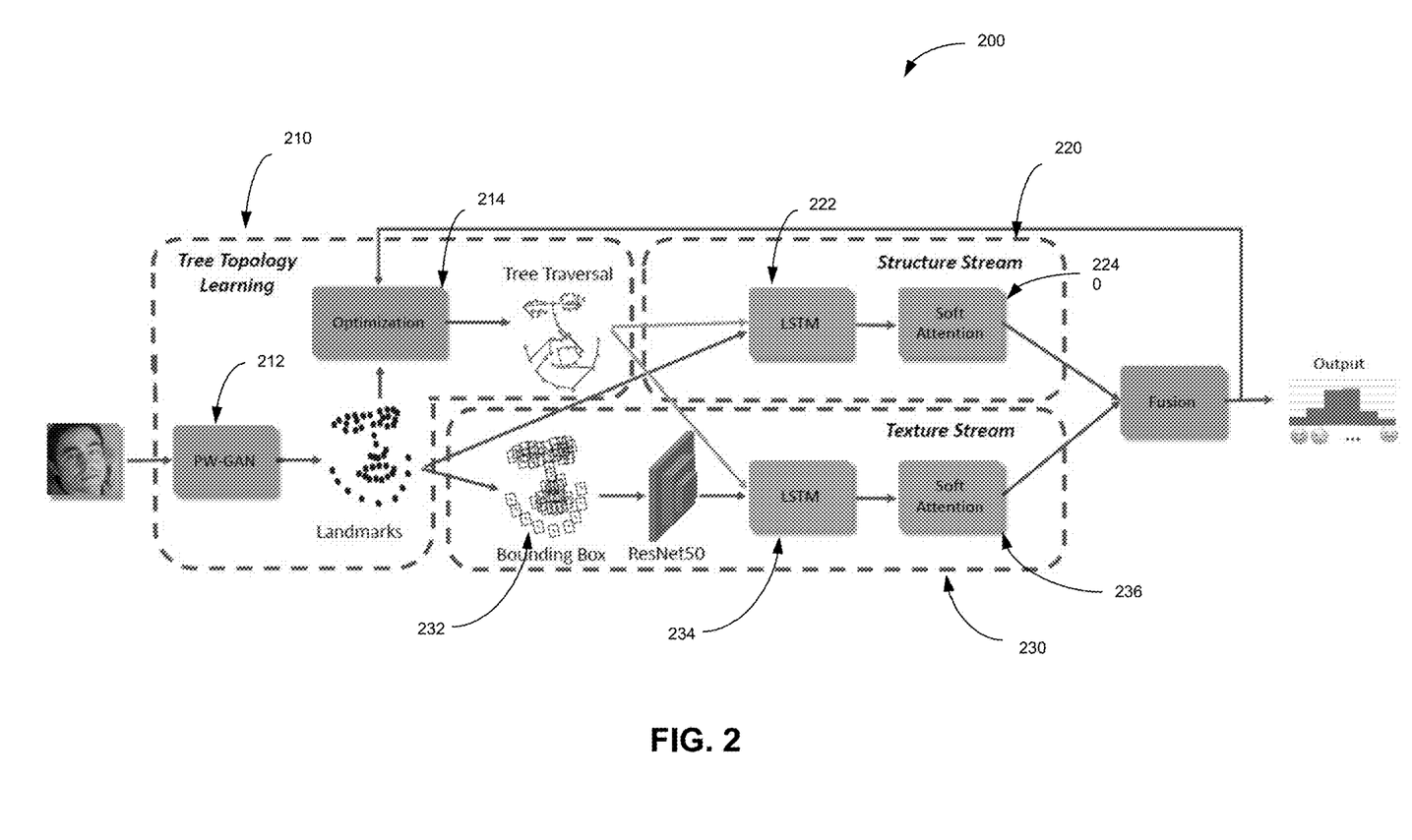
FIG. 2 is a schematic block diagram of a pipeline architecture in accordance with one or more implementations.

FIG. 2 illustrates a pipeline architecture 200 in accordance with disclosed implementations, which can be implemented by a programmed computing system. Pipeline architecture 200 can be divided into 3 functional components: tree topology component 210; structure stream component 220; and texture stream component 230, as shown in FIG. 2. In tree topology component 210, the tree learning is performed by extraction of facial landmarks by Pose-Weighted Generative Adversarial Network (PW-GAN) 212 and optimization component 214 to obtain the optimal tree. The optimized tree can be processed by structure stream component 220 and/or texture stream component 230 to learn separate structure and texture representations. The optimized tree is traversed to form a sequence, whose resultant embedding is then fed to structure stream component 220. Specifically, Long Short Term Memory network (LSTM) 222 receives the embedding as an input and the output of LSTM 220 can be fed to soft attention module 224 to focus on the salient cells of the LSTM network. LSTMs are a special kind of neural network, capable of learning long-term dependencies. "Soft attention" is when a context vector is calculated as a weighted sum of the encoder hidden states. In texture stream component 230, ResNet50 features are extracted from the local patches around extracted image landmarks determined by bounding box process module 232, prior to training separate LSTM 234 and fed to softs attention module 236, similar to the structure stream. The resulting embedding is fused with that of the structure stream to yield an expression class prediction. The operation of pipeline architecture 200 is described in more detail below.

In tree topology component 210, a weighted fully connected graph ($k_n$) is constructed from the extracted facial landmarks. The initial weights of the graph can be chosen at random. The optimum minimum-cost spanning tree with regards to these weights is determined, whose traversal generates a sequence specifying an embedding that can be input into an LSTM network for recurrently learning.

The minimum-cost spanning tree can be defined as:

$$a_{ij} \sum_{i=1}^{n} \sum_{j=1}^{n} a_{ij} \ni G(A) \text{ is tree,} \quad (1)$$

where A is an adjacency matrix of graph G(A) and $a_{ij}$ is an element of matrix A. The resulting G(A) is a minimum-cost spanning tree. The Prim's algorithm can be used to solve Eq. 1. The Prim's algorithm is a known algorithm that only visits a vertex once in each step. During this visit, an edge with a minimum weight, among all edges that are connected to that vertex, is considered as the selected edge for the minimum-cost spanning tree. By visiting all vertices, Prim's algorithm efficiently builds a "minimum-cost", e.g. most efficient, spanning tree. The built tree is then traversed using a traversal algorithm such as a preorder depth-first order algorithm, with the starting point of the most centered landmark, e.g., the nose tip. In the traversal, when reaching a leaf node, the traversal backtracks in the tree, and returns to the starting point. The traversal forms a sequence, which in turn is used to form an embedding that is input to structure stream component 220 and texture stream component 235.

Figure 3:
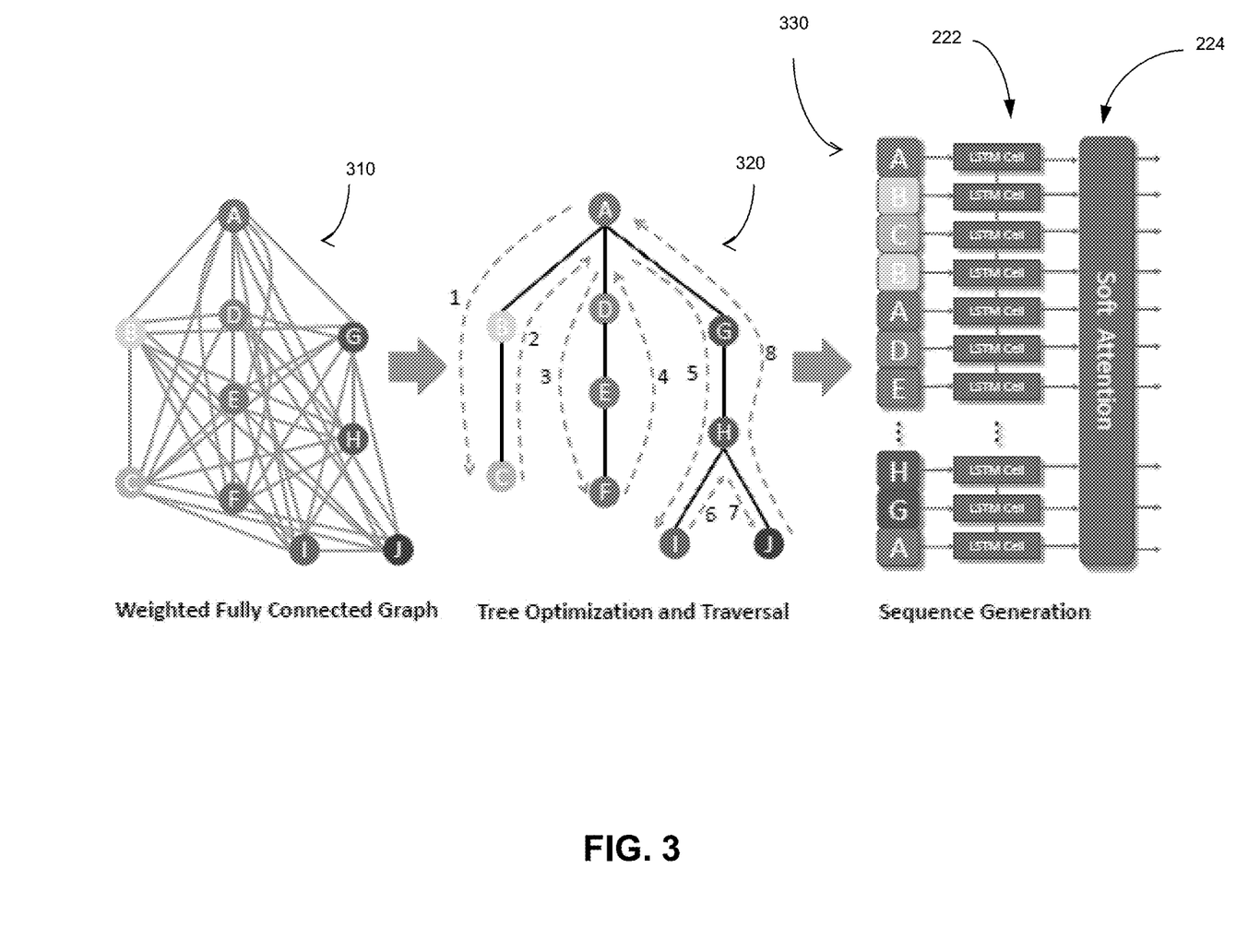
FIG. 3 is a schematic illustration of a tree traversal process and building of the LSTM input embedding in accordance with one or more implementations.

FIG. 3 depicts the tree traversal process and building of the embedding. In FIG. 3, the process is illustrated for a tree example with only 10 nodes for clarity. The weighted fully connected graph 310 can be traversed using a preorder depth-first order traversal technique and the traversal is backtracked when it reaches a leaf node, as noted above. The resulting tree optimization 320 is a data structure in which the most efficient traversals from each leaf to the root node are identified. The optimized tree in the example of FIG. 3 yields a node sequence 330 of A-B-C-B-A-D-E-F-E-D-A-G-H-I-H-J-H-G-A that is used as embeddings to be input into LSTM network 222 (see also FIG. 2).

Tree topology learning module 210 (FIG. 20 updates the learnable weights associated with $k_n$. To this end, a combinatorial optimization algorithm as used. For the combinatorial optimizer's objective function, the loss function of the end-to-end pipeline is expressed as follows:

$$J(w) = \frac{1}{m}\sum_{i=1}^{m} L(\hat{y}^{(i)}, y^i), \quad (2)$$

where w is the weights of the complete graph $k_n$, m is the size of the training set, and L(x) is the loss function selected to maximize performance for the specific problem.

At each training epoch, a combinatorial algorithm generates a set of weights associated with $k_n$, from which the minimum-cost spanning tree, whose traversal results in a particular sequence, is generated. Next, this sequence is frozen, and the subsequent structure and texture streams are fully trained. Once training of the two streams is complete, the final loss is fed to the combinatorial optimizer as the objective of an optimization, which then generates a new set of weights for $k_n$ and this process can continue repeatedly until convergence. It should be noted that the obtained graph is converted to a tree for determining the optimal sequence because the acyclic nature of trees is better suited for traversal, and thus better for sequence generation.

The coordinates of the facial landmarks extracted in tree topology learning component 210, along with the obtained sequence, are the inputs to structure stream component, 220, as shown in FIG. 2. By using this sequence, an embedding is generated and can be fed to an LSTM network with peephole connections. The embedding can be expressed as:

$$O(X, W_{graph}) = x_\alpha x_\beta \ldots x_\gamma, \quad (3)$$

where, X is the set of the facial landmarks' coordinates, $W_{graph}$ is the weights of the complete graph, and each of $x\alpha x_\beta \ldots x_\gamma$ belongs to the set X. Note that, since the tree traversal algorithm may visit a node more than once, as shown in FIG. 3, the output chain may include repeated nodes. Soft attention modules 224 and 236 are included to better focus on more important parts of the embeddings by applying learned weights. To this end, the hidden state vectors $h_i$ of the LSTM cells are multiplied by a set of coefficients $\alpha_i$ which determines the level of the attention that it receives and can be calculated using:

$$\alpha_i = \frac{e^{u_i}}{\sum_{k=1}^{n} e^{u_k}}, \quad (4)$$

where, n is the number of LSTM units, and $u_i$ is calculated as:

$$u_i = \tan h(W_h h_i + b_h). \quad (5)$$

Where $W_h$ and bh are the trainable weights and biases. The attentive output can be calculated using:

$$H = \sum_i \alpha_i h_i, \quad (6)$$

where H is the final embedding of the structure stream.

The inputs of texture stream component 230 are the facial landmarks and the sequence generated in the face tree topology learning step. However, unlike structure stream component 220, where the coordinates of facial landmarks are used to form an embedding for subsequent use in an LSTM network, in texture stream component 230, the focus is on the texture of the facial images. To this end, first n×n patches centered around each facial landmark are formed. The patches are then cropped from the images and fed to a ResNet50 pretrained on, for example, the VGG-Face2 dataset. Through empirical experiments, it was found that a patch size of 17×17 pixels yields good results. These embeddings are stacked in accordance with the sequence obtained from the tree topology learning component 210. The resulting embedding is then passed onto LSTM network 234. This is followed by soft attention process component 236 in a manner similar to the structure stream (see Equations 4-6 above).

Figure 4:
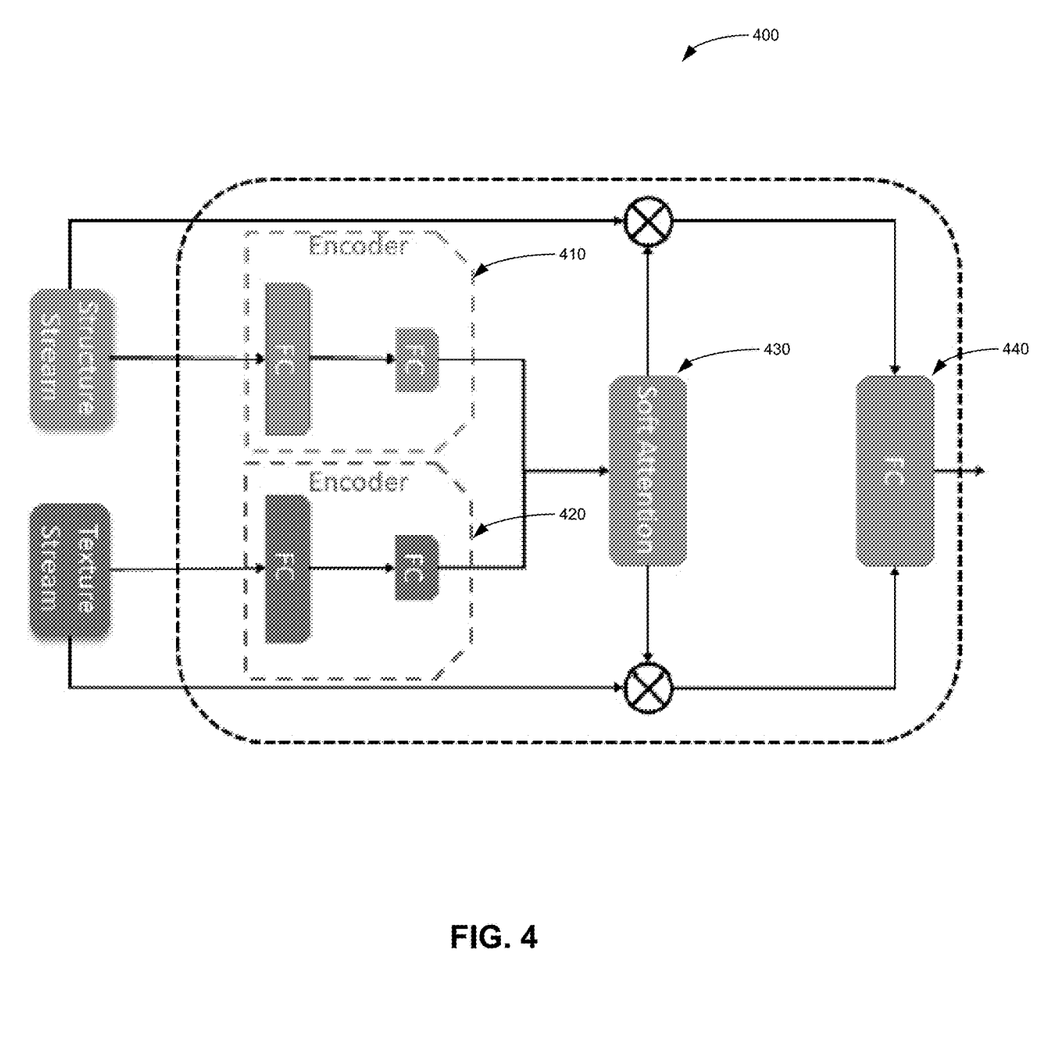
FIG. 4 is a schematic block diagram of a fusion methodology in accordance with disclosed implementations.

In order to fuse the outputs of the structure and texture streams, a two-stream fusion strategy, such as that disclosed in Yue Gu, Kangning Yang, Shiyu Fu, Shuhong Chen, Xinyu Li, and Ivan Marsic, *Hybrid attention based multimodal network for spoken language classification*, Proceedings of the conference. Association for Computational Linguistics, Meeting, volume 2018, page 2379 can be used. FIG. 4 illustrates a fusion methodology 400 in accordance with disclosed implementations. This methodology has been designed to preserve the original characteristics of its input embeddings and has yielded state-of-the-art results in a number of areas where preserving and incorporating these characteristics are of particular importance.

Two dense, i.e. non-linear, layers of classifiers are used as encoders 410 and 420, respectively, for each of the input streams (structure and texture). Each of encoders 410 and 420 generate stream-specific features. Then, a soft attention component 430 is applied to learn the weight by using the following equation:

$$\alpha = \text{softmax}(\tan h(W_f[T^*, S^*] + b_f)), \quad (7)$$

where $W_f$ and $b_f$ are trainable weights and biases respectively. $T^*$ and $S^*$ are the stream-specific features of texture and structure streams, respectively. Next, a dense layer classifier 440 is utilized to learn the optimal association across the embedding-specific features as:

$$y = \tan h(W_y[(1+\alpha_T)T, (1+\alpha_S)S] + b_y), \quad (8)$$

where y is the final embedding, $W_y$ and $b_y$ are trainable weights and biases, and T and S are the output embeddings of texture and structure streams, respectively. The final decision is made by using a softmax classifier with y as its input.

Figure 5:
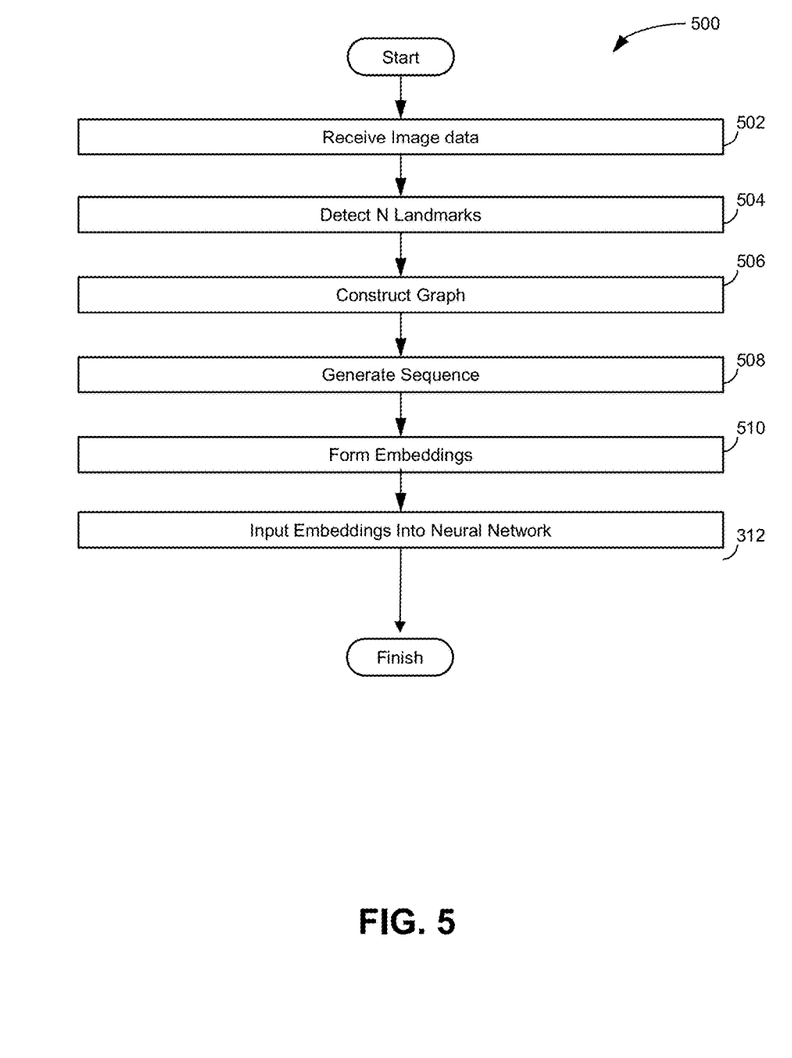
FIG. 5 a flow chart of a method for learning an optimal graph in the form of a tree topology defining a sequence that can be used by a learning network for image recognition

FIG. 5 illustrates a high level method 500 for learning an optimal graph in the form of a tree topology defining a sequence that can be used by a learning network for image recognition in accordance with disclosed implementations. At 502 image data representing the image of an object is received. At 504, N landmarks are detected on the image using a deep regression algorithm, wherein N is an integer. At 506, a weighted, fully connected, graph is constructed from the landmarks by assigning initial weights for the landmarks randomly and determining the optimized tree structure based on the initial weights. At 508, a sequence is generated by traversing the tree structure. At 510, a series of embeddings representing the object image is formed based on the sequence. At 512, the embeddings can be inputted into a neural network to thereby generate an image recognition signal based on the embeddings.

Details of a specific example of the disclosed implementation applied to FRE will be discussed below. The entire architecture can be been implemented using TensorFlow and can be trained using a pair of Nvidia RTX 2080 Ti GPUs. For optimizing the weights of the two streams, an ADAM optimizer was used, with the learning rate, first-momentum decay, and second-momentum decay of 0.001, 0.9, 0.99 respectively. All of the reported results were obtained on the validation sets of the respective datasets.

Two popular in-the-wild facial expression datasets were used to evaluate the disclosed implementations. The first dataset, AffectNet includes more than 1 million images, all of which have been obtained from the internet by leveraging 3 search engines. About half of the dataset has been manually annotated in both categorical model for the presence of 7 facial expressions (anger, disgust, fear, happy, sad, surprise, and contempt) plus neutral, and in dimensional model for valence and arousal intensities. The validation set of this dataset includes 500 images for each expression class. The FER2013 dataset includes 28709, 3589, and 3589 images for training, validation, and testing. All the images have been resized to 48×48 pixels. Face images in this dataset are labeled as having one of the 6 basic expressions (anger, disgust, fear, happy, sad, and surprise) along with neutral.

Figure 6:
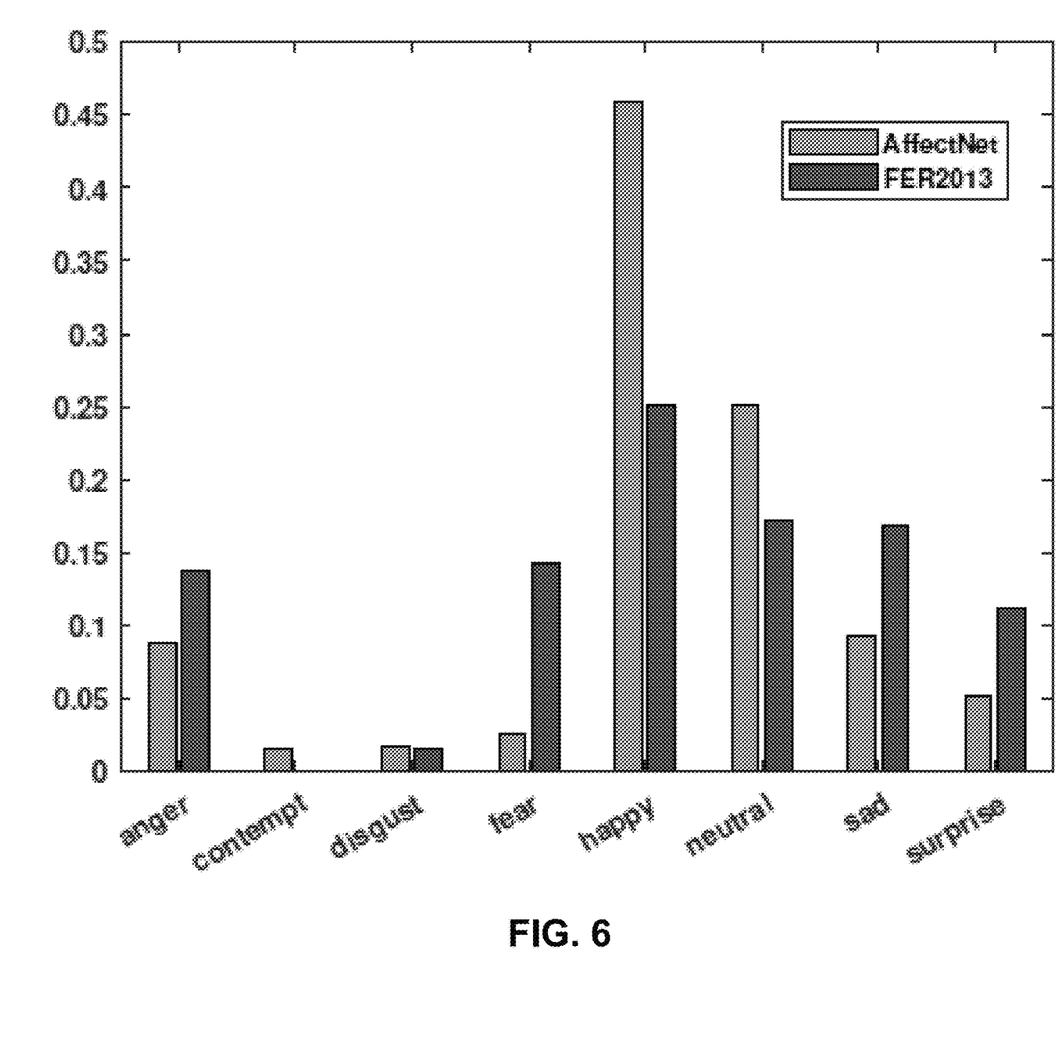
FIG. 6 illustrates the probability mass function (pmf) of an example of the disclosed implementations.

FIG. 6 illustrates the probability mass function (pmf) of AffectNet and FER2013 datasets, showing that these distributions are highly skewed towards the 'happiness' expression. This matter can cause the FER methods to perform poorly on minority classes. To tackle this problem, focal loss was utilized as the loss function L(x) in Eq. 2. Focal $$\text{focL} = -\alpha_b(1-p_b)^\gamma \log(p_b), \quad (9)$$

where $\gamma$ is the focusing parameter and $p_b$ is defined as:

$$p_b = \begin{cases} p & y = 1 \\ 1-p & \text{otherwise} \end{cases}, \quad (10)$$

where p is the probability of y=1, which is estimated by the model. Focal loss causes the learning algorithm to be less focused on the classes with higher number of samples.

The obtained recognition rates by the example (Face Tree Topology) and other state-of-the-art benchmarking methods are presented in Table 1 below for both AffectNet and FER2013 datasets. With respect to the AffectNet dataset, the disclosed implementations show an improvement of 1.52% and 3.28% over the BreG-NeXt50 and BreG-NeXt 32, which are currently the state-of-the-art FER methods. Note that BreG-NeXt 50 and BreG-Next 32 have also utilized focal loss as their loss function. Given the FER2013 dataset, the disclosed implementations outperform the current state-of-the-art FER method, i.e., BreG-Next 50, showing a performance improvement of 1.13%.

| Dataset | Year | Method | Rec. Rate |
| --- | --- | --- | --- |
| AffectNet | 2018 | CNN for inconsistent label handling | 57.31 |
| | 2018 | Light CNN | 58 |
| | 2019 | Ensemble deep learning | 62.11 |
| | 2019 | Facial mask learning | 61.50 |
| | 2020 | Expression synthesis from neutral | 60 |
| | 2020 | BreG-NeXt 32 | 66.74 |
| | 2020 | BreG-NeXt 50 | 68.50 |
| | 2021 | Face tree topology | 70.02 |
| FER2013 | 2013 | CNN + SVM | 69.3 |
| | 2016 | CNN | 66.4 |
| | 2017 | New CNN architecture | 71.2 |
| | 2020 | BreG-NeXt 32 | 69.11 |
| | 2020 | BreG-NeXt 50 | 71.53 |
| | 2021 | Face tree topology | 72.66 |

Figure 7:
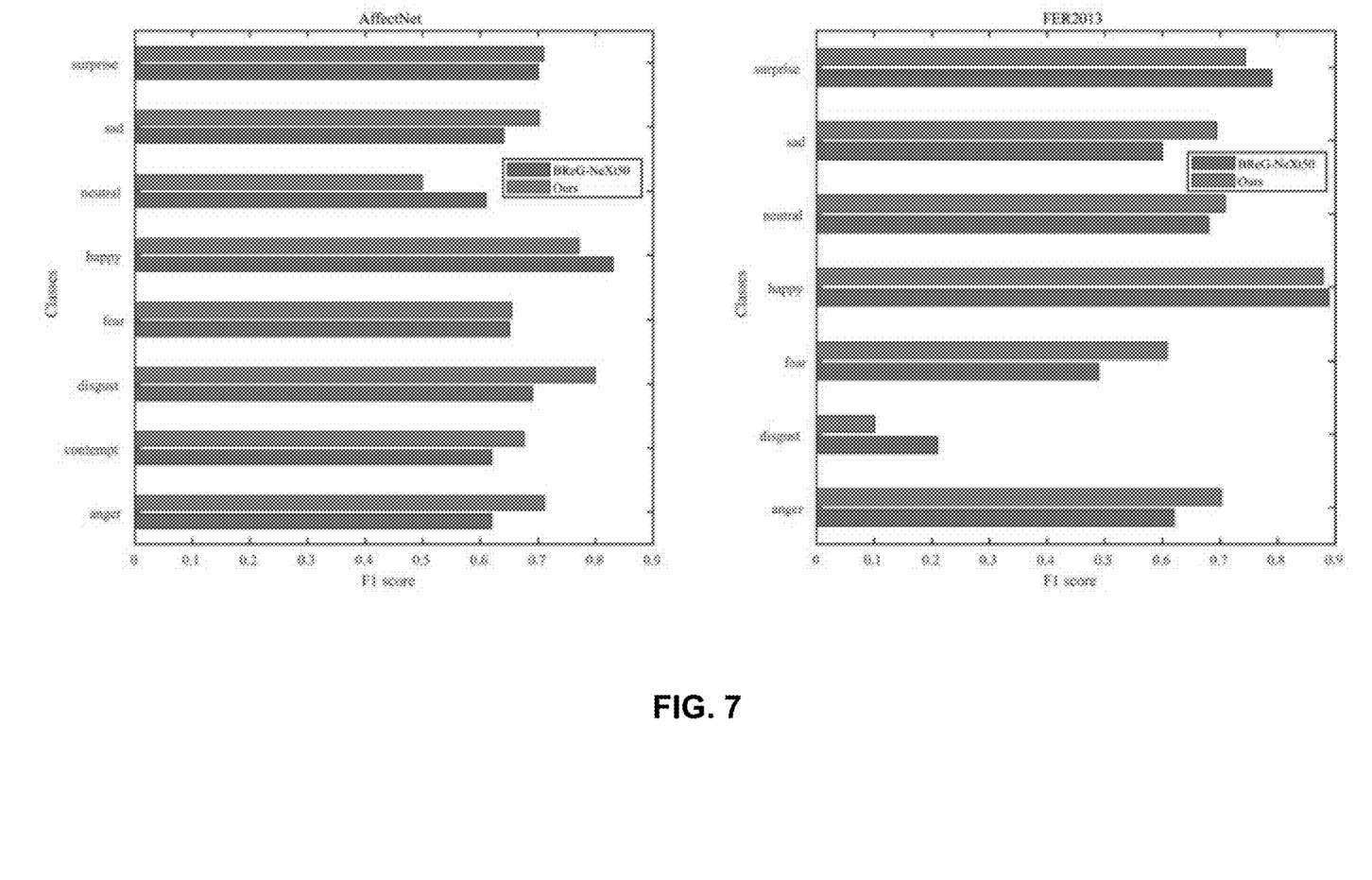
FIG. 7. illustrates F1 scores of each expressions achieved by an example of the disclosed implementations.

For a side-by-side comparison between the disclosed implementations and BreG-NeXt 50, F1 scores of each expression were outlined by using the one-vs-all method. The results are shown in FIG. 7. With respect to the AffectNet dataset, the disclosed implementations (FTNet) have higher F1 scores than BreG-NeXt 50 in all the 8 expression classes except happiness and neutral. As mentioned before, AffectNet is skewed toward happiness and neutral expressions. However, the disclosed implementations have shown better results in the minority expressions which are more difficult to be recognized. With regards to FER2013, FTNet has achieved better F1 scores in 4 out of 7 expressions. The exceptions are surprise, happiness, and disgust expressions, in which BreG-NeXt 50 perform slightly better.

Figure 8:
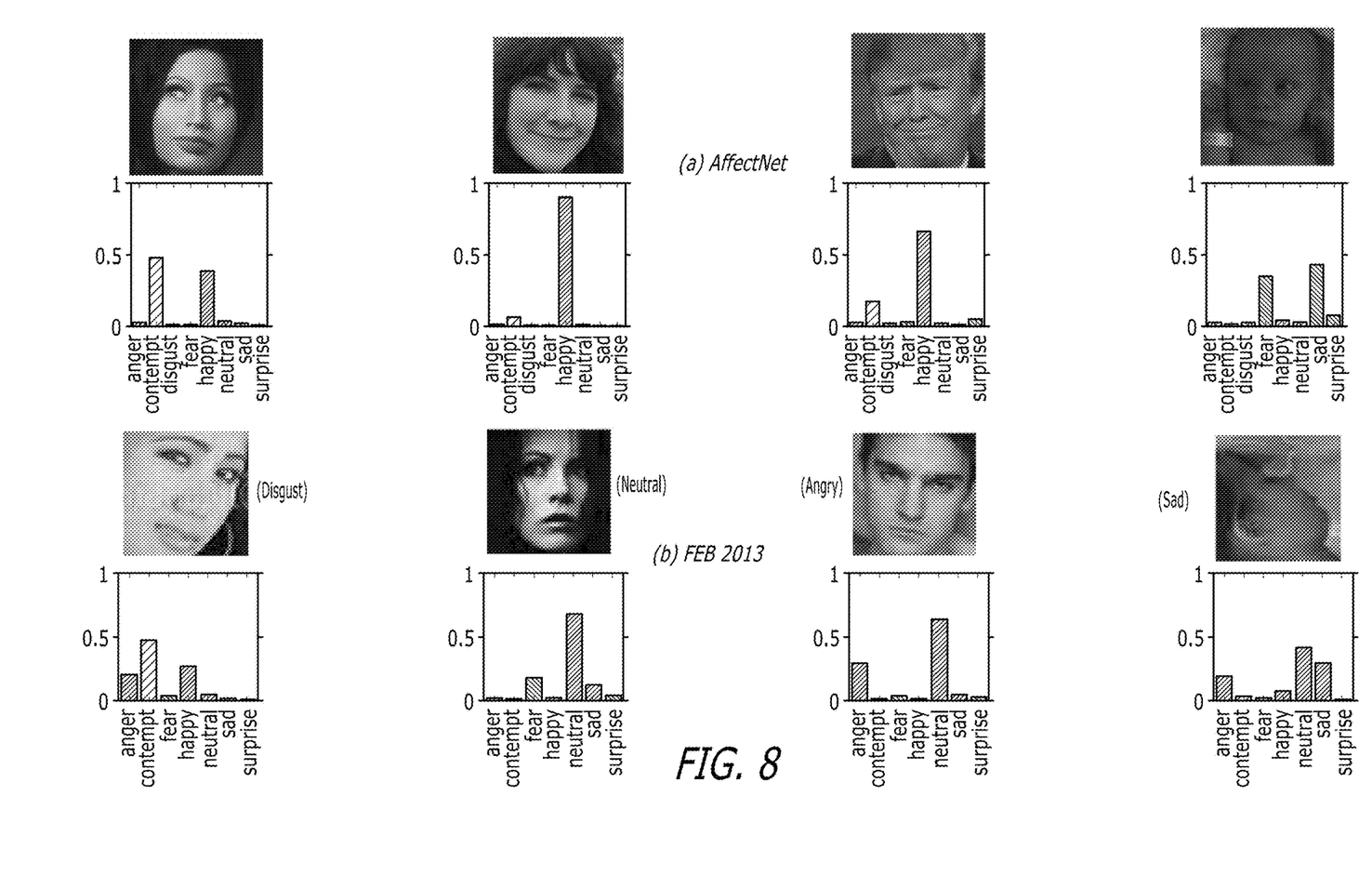
FIG. 8 shows some of the classified samples achieved by an example of the disclosed implementations.

FIG. 8 shows some of the well-classified and misclassified samples, along with the corresponding input images from the validation sets of AffectNet and FER2013 datasets along with the corresponding predicted and ground truth expressions. It can be seen from FIG. 8 that, in the pmf of miss-classified cases, ground truth expression has the 2nd highest probability. This indicates that even in miss-classified cases, the disclosed implementation have a probabilistic sense to the ground truths, and do not generate pmfs which are far away from the ground truth.

Figure 9:
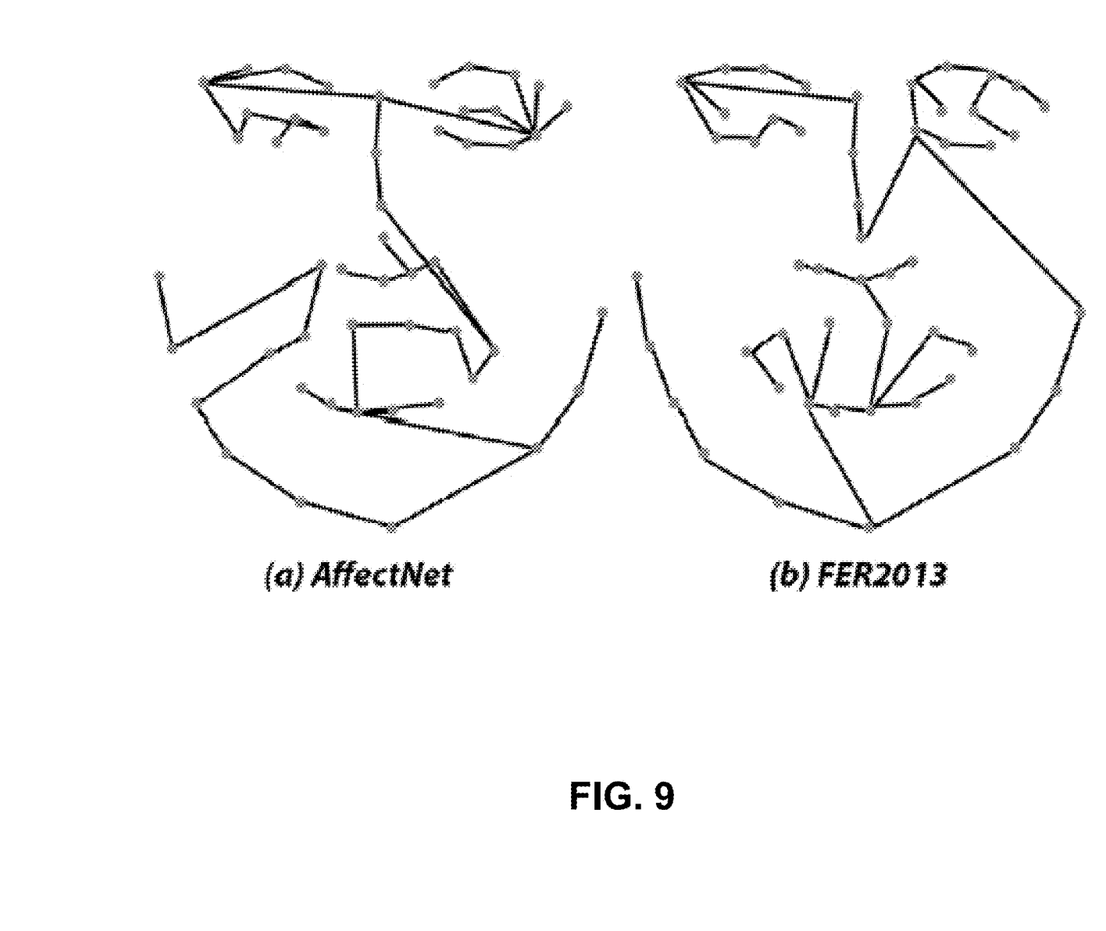
FIG. 9 illustrates an example of minimum-cost spanning trees, obtained by an example of the disclosed implementations.

FIG. 9 illustrates an example of the minimum-cost spanning trees, obtained by disclosed implementations for AffectNet and FER2013 datasets. Traversal of these trees provides the optimal sequence to feed the sequence learner, e.g., an LSTM. It is clear from FIG. 9 that larger variations between the two trees occurred near the mouth and eyes regions. However, the trees are almost identical around the jaw line. This is not surprising, because the regions around the eyes and mouth are very representative in FER, so facial expressions are more reflected in these regions. As a result, these regions are more sensitive, because they are designed based on the properties of each dataset.

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for generating an image recognition signal that can be used by a learning network for image recognition, the method comprising:
receiving image data representing the image of an object;
detecting N landmarks on the image using a deep regression algorithm, wherein N is an integer;
constructing a weighted, fully connected, graph kn from the landmarks by assigning initial weights for the landmarks randomly;
determining an optimized tree structure based on the initial weights;
generating a sequence by traversing the tree structure;
forming a series of embeddings based on the sequence, the embeddings representing the object image; and
inputting the embeddings into a neural network to thereby generate an image recognition signal based on the embeddings.

2. The method of claim 1, wherein the image data is facial image data representing an image of a person's face and the image recognition signal is a facial recognition signal.

3. The method of claim 2, further comprising, frontalizing the facial image data with a dual attention generative adversarial network (DA-GAN) before the constructing.

4. The method of claim 1, further comprising inputting the sequence into the neural network to thereby generate the image recognition signal based on the sequence and the embeddings.

5. The method of claim 4, wherein an output of the neural network is fed back for use in the constructing, generating, and forming steps.

6. The method of claim 1, wherein the neural network is a Long Short-Term Memory (LSTM) neural network.

7. The method of claim 1, wherein the sequence represents a structure of the object and generating the sequence comprises finding an optimum minimum-cost spanning tree G(A) by using the Prim's Algorithm to solve;

$$a_{ij}\sum_{i=1}^{n}\sum_{j=1}^{n}a_{ij} \ni G(A) \text{ is tree,}$$

where;
A is an adjacency matrix of graph G(A), and
$a_{ij}$ is an element of matrix A.

8. The method of claim 7, wherein generating the sequence further comprises traversing the tree structure using a preorder depth-first order traversal algorithm starting point of a geometrically most centered landmark of the N facial landmarks.

9. The method of claim 1, wherein N=50.

10. The method of claim 1, wherein forming the embeddings comprises determining the embeddings based on;

$$O(X, W_{graph}) = x_\alpha x_\beta \ldots x_\gamma,$$

where;
X is the set of the landmarks' coordinates,
$W_{graph}$ is the weights of the complete graph, and
each of $x_\alpha x_\beta \ldots x_\gamma$ belongs to the set X.

11. The method of claim 1, wherein the embeddings represent a texture of the image.

12. The method of claim 11, where generating the embeddings comprises:
forming n×n patches respectively centered around each of the landmarks; and
cropping the patches from the image data and feeding the corresponding data to a pretrained convolutional neural network.

13. A system for generating an image recognition signal that can be used by a learning network for image recognition, the system comprising:
at least one computer processor configured to execute computer-readable instructions; and
at least one memory device having computer-readable instructions recorded thereon which, when executed by the at least one computer processor, cause the at least one computer processor to conduct the method of;
receiving image data representing the image of an object;
detecting N landmarks on the image using a deep regression algorithm, wherein N is an integer;
constructing a weighted, fully connected, graph kn from the landmarks by assigning initial weights for the landmarks randomly;
determining an optimized tree structure based on the initial weights;
generating a sequence by traversing the tree structure;
forming a series of embeddings based on the sequence, the embeddings representing the object image; and
inputting the embeddings into a neural network to thereby generate an image recognition signal based on the embeddings.

14. The system of claim 13, wherein the image data is facial image data representing an image of a person's face and the image recognition signal is a facial recognition signal.

15. The system of claim 14, wherein the method further comprises, frontalizing the facial image data with a dual attention generative adversarial network (DA-GAN) before the constructing.

16. The system of claim 13, wherein the method further comprises inputting the sequence into the neural network to thereby generate the image recognition signal based on the sequence and the embeddings.

17. The system of claim 16, wherein an output of the neural network is fed back for use in the constructing, generating, and forming steps.

18. The system of claim 13, wherein the neural network is a Long Short-Term Memory (LSTM) neural network.

19. The system of claim 13, wherein the sequence represents a structure of the object and generating the sequence comprises finding an optimum minimum-cost spanning tree G(A) by using the Prim's Algorithm to solve;

$$a_{ij}\sum_{i=1}^{n}\sum_{j=1}^{n}a_{ij} \ni G(A) \text{ is tree,}$$

where;
A is an adjacency matrix of graph G(A), and
$a_{ij}$ is an element of matrix A.

20. The system of claim 19, wherein generating the sequence further comprises traversing the tree structure using a preorder depth-first order traversal algorithm starting point of a geometrically most centered landmark of the N facial landmarks.

21. The system of claim 13, wherein N=50.

22. The system of claim 13, wherein forming the embeddings comprises determining the embeddings based on;

$$O(X, W_{graph}) = x_\alpha x_\beta \ldots x_\gamma,$$

where;

X is the set of the landmarks' coordinates, $W_{graph}$ is the weights of the complete graph, and each of $x_\alpha x_\beta \ldots x_\gamma$ belongs to the set X.

23. The system of claim 13, wherein the embeddings represent a texture of the image.

24. The system of claim 23, where generating the embeddings comprises:
   forming n×n patches respectively centered around each of the landmarks; and
   cropping the patches from the image data and feeding the corresponding data to a pretrained convolutional neural network.

25. Non-transient computer readable media having computer-readable instructions recorded thereon which, when executed by at least one computer processor, cause the at least one computer processor to conduct the method of;
   receiving image data representing the image of an object;
detecting N landmarks on the image using a deep regression algorithm, wherein N is an integer;
   constructing a weighted, fully connected, graph kn from the landmarks by assigning initial weights for the landmarks randomly;
   determining an optimized tree structure based on the initial weights;
generating a sequence by traversing the tree structure;
   forming a series of embeddings based on the sequence, the embeddings representing the object image; and
   inputting the embeddings into a neural network to thereby generate an image recognition signal based on the embeddings.

* * * * *